United States Patent [19]
Yan

[11] Patent Number: 5,800,639
[45] Date of Patent: Sep. 1, 1998

[54] HYDROGEN STORAGE ELECTRODE COMPOSED OF ALLOY WITH DENDRITE-FREE LAVES PHASE STRUCTURE

[75] Inventor: De Yi Yan, Santa Clara, Calif.

[73] Assignee: Mobius Green Energy, Inc., Santa Clara, Calif.

[21] Appl. No.: 541,942

[22] Filed: Oct. 10, 1995

[51] Int. Cl.$^6$ ............... H01M 4/38; C01B 6/02; C22C 19/03; C22C 19/30
[52] U.S. Cl. ............. 148/426; 420/900; 420/434; 420/580; 423/218
[58] Field of Search ............. 148/426; 420/900, 420/434, 580; 423/59, 224, 218, 644; 75/235, 246

[56] References Cited

U.S. PATENT DOCUMENTS

| | | | |
|---|---|---|---|
| 4,913,879 | 4/1990 | Honda et al. | 420/900 |
| 4,946,646 | 8/1990 | Gamo et al. | 423/644 |
| 5,006,328 | 4/1991 | Hong | 450/900 |

FOREIGN PATENT DOCUMENTS

| | | |
|---|---|---|
| 293660 | 7/1988 | European Pat. Off. . |
| 63-147801 | 6/1988 | Japan . |
| 1-60961 | 3/1989 | Japan . |
| 1102855 | 4/1989 | Japan . |
| 6187983 | 7/1994 | Japan . |
| 6283169 | 10/1994 | Japan . |

*Primary Examiner*—David A. Simmons
*Assistant Examiner*—Margery S. Phipps
*Attorney, Agent, or Firm*—Bo-In Lin

[57] ABSTRACT

The present invention discloses a type of novel material compositions for hydrogen storage. The material compositions includes a hydrogen storage Laves-phase alloy which has a material composition represented by $A_{1-x}B_xC_y$ where $A=(Zr \text{ or } Hf)_{1-X_1}Ti_{X_1}$ and X1 has a value between zero to one, B=La, Ce, Pr, Nd and mixed rare earth, alkaline, or alkaline earth metallic element, $C=V_{Y_1}Ni_{Y_2}$, where Y1 has a value between zero to 0.8, Y2 has a value between 1.3 to 3.0, and X has a value between zero to 0.2 and Y has a value between 2.0 to 3.0. In a preferred embodiment, when the value of X is greater than zero, the Laves-phase alloy includes a plurality of B—Ni clusters.

5 Claims, 11 Drawing Sheets

HYDROGEN STORAGE ELECTRODE COMPOSED OF ALLOY WITH DENDRITE-FREE LAVES PHASE STRUCTURE

BACKGROUND OF THE INVENTION

1. Field of the Invention

This invention relates generally to the material compositions for hydrogen storage. More particularly, this invention relates to a novel hydrogen storage alloy which has a dendrite free Laves phase structure providing improved electrocatalytic activity.

2. Description of the Prior Art

The electrodes for hydrogen storage used in battery and other energy cycle applications encounter many technical difficulties including relatively short cycle-life time, low charge and discharge rates, small capacity of hydrogen storage, high temperature of hydride formation, and the uncertainty and instability in performance characteristics of the material compositions for hydrogen storage. These technical difficulties can be better appreciated when various hydrogen storage materials are being tested for application in a more demanding environment such as using the electrodes as the negative electrodes for electrical vehicle (EV) batteries. They become major 'roadblocks' preventing practical and economical commercialization of the non-emissive electrical cars to replace the combustion powered vehicles. Other than specific application for powering electrical-cars, these technical difficulties also limit the usefulness of hydrogen storage for other types of energy-cycle systems, including but not limited to rechargeable batteries, even the demand for energy-cycle performance may not be as high as that required for electrical vehicle batteries.

In a hydrogen storage system, some of the more important factors in determining the system performance characteristics are the compositions of the hydrogen storage materials and their micro-structural changes in the processes of hydrogen absorption and desorption cycles. Since the finding of large hydrogen storage capacity of a transition metal palladium in 1866, numerous research efforts have been devoted to develop many types of hydrogen storage compositions using transition metals. The development of compositions such as $ZrNi_2$, $Mg_2Cu$, $TiFe$, $LaNi_5$, etc., are just few landmark research results among numerous hydrogen storage materials being produced.

Many metal alloys are employed as hydrogen storage materials disclosed in a great number of U.S. patents. Starting with U.S. Pat. No. 4,112,199 (issued on Sep. 5, 1978) a negative electrode with a composition of $LaNi_5$ is used. In another U.S. Pat. No. 4,160,014 (issued on Jul. 3, 1979) a hydrogen storage alloy $AB_\alpha$ is disclosed where $\alpha$ is between 1.0 to 3.0, $A=Ti_xZr_{1-x}$ where x is between 50% and 100% in atomic weight, $B=Mn_yV_{1-y}M_{1-y}$ where y is between 30% and 100% atomic weight. This is probably the earliest $AB_2$ type of alloy disclosed for hydrogen storage. Another important patent issued to Philips is U.S. Pat. No. 4,214,043 (issued on Jul. 22, 1980) which claims a sealed rechargeable electrochemical cell includes positive and negative electrodes, the negative electrode including $LaNi_n$ where $4.8<n<5.4$, has a $CaCu_5$-crystal structure, and La may be partially substituted by elements from {Ca, Th, Ti, Rare Earth metals, Yi} and Ni may be partially substituted by elements from {Cu, Cr, Fe}. This patent represents another group of alloys, i.e., the $AB_5$ alloys, employed as material for hydrogen storage.

On the basis of the material compositions disclosed in these earlier U.S. patents, many subsequent inventions mostly in the families of $AB_2$ and $AB_5$ types of alloys are disclosed in many U.S. patents since 1980. Few examples of these inventions are: (1) U.S. Pat. No. 4,228,145 (issued on Oct. 14, 1980) claiming a hydrogen storage binary alloy, Laves phase intermetallic compound with a hexagonal MgZn2 (C14) type crystal structure with specified crystal structure parameters of a and c, and includes Zr & Mn, Ti & Mn, or Ti, Zr, & Mn. (2) U.S. Pat. No. 4,370,163 (issued on Jan. 25, 1983) claiming a hydrogen storage alloy, $Ti_{1-x}A_xFe_{y-z}B_z$ wherein A is Hf & Zr, B is from Cr, Cu etc. (3) U.S. Pat. No. 4,551,400 (issued on Nov. 5, 1985) claiming active material for hydrogen storage electrode comprising the composition formula selected from the group consisting of: (a) $(TiV_{2-x}Ni_x)_{1-y}M_y$ where $0.2 \leq x \leq 1.0$, $0.0 \leq y \leq 0.2$ & M=Al or Zr; (b) $Ti_{2-x}Zr_xV_{4-y}Ni_y$ where $0.\leq x \leq 1.5$, $0.6 \leq y \leq 3.5$; (c) $Ti_{1-x}Cr_xV_{2-y}Ni_y$ where $0.\leq x \leq 0.75$, $0.2 \leq y \leq 0.1$; and (d) $TiV_{2-x}Ni_x$ where $0.4 \leq x \leq 0.45$. (4) U.S. Pat. No. 4,656,023 (issued on Apr. 7, 1987) claiming a hydrogen storage material comprising a ternary alloy of $Zr_{1-x}Ti_xCrFe_y$ where $0.1 \leq x \leq 0.3$, $1.2 \leq y \leq 1.4$; (5) U.S. Pat. No. 4,699,856 (issued on Oct. 13, 1987) claiming a sealed rechargeable electrochemical cell includes a negative electrode which has a CaCu5-structure and the compositional formula $AB_mC_n$ where m+n is between 4.8 and 5.4, n is between 0.05 and 0.6 and (a) A consists of Mischmetall or one or more elements selected from the group consisting of Y, Ti, Hf, Zr, Ca, Th, La, and the remaining rare earth metals, in which the total atomic quantities of the elements Y, Ti, Hf, and Zr may not be more than 40% of A, (b) B consists of two or more elements selected from Ni, Co, Cu, Fe and Mn where the maximum atomic quantity per gram atom of A is for Ni:3.5, for Co:3.5, for Cu:3.5, for Fe 2.0, and for Mn:1.0, and (c) C consists of one or more elements selected from Al, Cr, & Si in the indicated atomic quantities: Al:0.05–0.6, Cr:0.05–0.5, and Si:0.05–0.5, characterized in that the electrochemically active material additionally comprises one or more metals selected from the group formed by Pd, Pt, Ir, and Rh, the atomic quantity per gram atom of A being from 0.001 to 0.5; (6) U.S. Pat. No. 4,728,586 (issued on Mar. 1, 1988) claiming a hydrogen storage alloy with composition $(Ti_{2-x}Zr_xV_{4-y}Ni_y)Cr_{1-z}$ where $0.0 \leq x \leq 1.5$, $0.6 \leq y \leq 3.5$ & z is an effective amount less than 0.2, where at least one of the components is soluble in the alkaline media, and the alloy includes chromium as a modifier to inhibit the corrosion; and (7) U.S. Pat. No. 4,849,205 (issued on Jul. 18, 1989) claiming a material for hydride hydrogen storage and a hydride electrode, the material comprising composition formula selected from four groups consisting of alloys made from different combinations of Ti, Cr, Zr, Ni, V, Mn, etc.

Between these major types of alloys, i.e., $AB_5$ and $AB_2$ alloys, $AB_5$ alloys tend to have more dynamic electrochemical activities thus providing higher charge and discharge rates, but generally suffer from the disadvantage of shorter life cycles. On the other hand, the AB or $AB_2$ types of alloys tend to have longer useful life but are limited by poor kinetics in electrochemical activities which causes many operational difficulties. First, the discharge rate of these types of alloys is built up very gradually before the battery cells can reach their peak performance. Secondly, sudden drops in discharge capacity often occurs when large amount of discharge takes place in short period of time. A specific example is an alloy of Zr—Ti—V—Ni composition, e.g., $Zr_{0.5}Ti_{0.5}V_{0.75}Ni_{1.25}$, provides higher capacity (370 mAh/g), longer cycle life, satisfactory charge retention, but poor kinetic characteristics and difficult activation. Therfore, neither $AB_2$ nor $AB_5$ alloys provide suitable hydrogen storage materials to satisfy the increase demand for longer life cycle and more dynamic performance levels required for the modern rechargeable batteries.

In addition to these technical limitations, the life cycles and battery performance are also adversely affected due to some intrinsic problems with the conventional methods of fabricating electrodes. The first method generally applied is to mixed and pressed the alloy powder into an electrode shape and baked with high temperature. Even with the protection of idle gases during the baking process, the surfaces of the electrodes often are insulated with a thin layer of oxide thus causing poor electrode performance in the charge and discharge cycles. The second method is to press the alloy powders, the nickel powders, mixed with adhesive compounding agent into electrode shape which is then wrapped in a nickel 'net' formed by thin nickel wires. The nickel net is then welded onto the electrode to form a containing and protective layer for the electrode. The nickel net layer tends to expand and tear away from the alloy powder due to the continuous cycles of charge and discharge when hydrogen bubbles formed inside the net. The alloy powder will fall off from the containing net which leads to loss of capacity of hydrogen storage and decline in battery performance. A third method is to mix the alloy powder, the nickel powder, the adhesive compounding agent, and the nickel wires. The mixture is then pressed into electrode shape and baked with high temperature. Again, this method also leads to difficulties caused by oxide layer formed on the surfaces.

Figure 1:
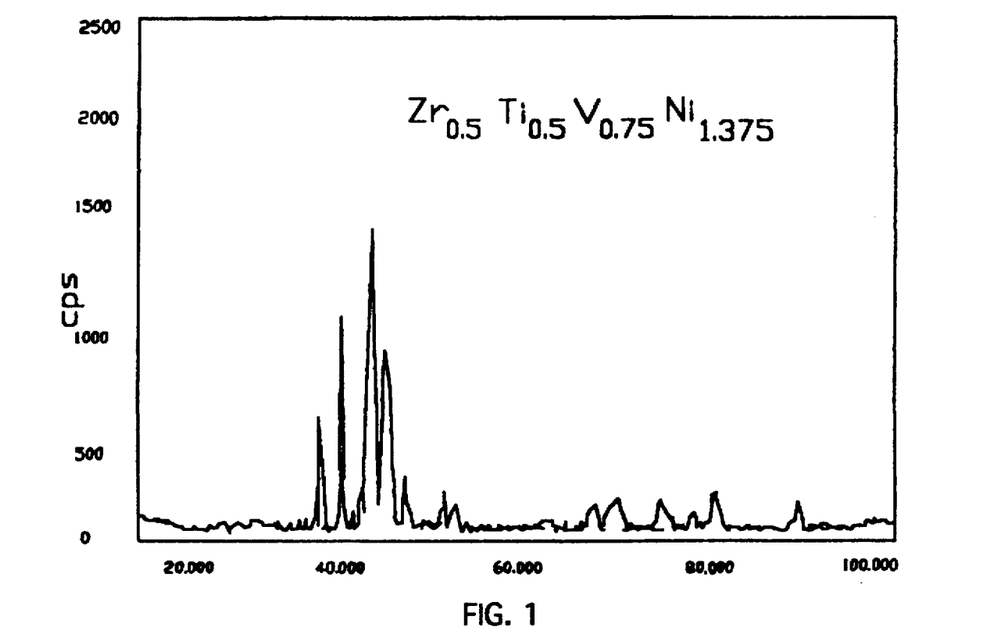
FIGS. 1, 2, 3, 4, and 5 are spectra of X-Ray Diffraction (XRD) analysis results for alloys of the present invention.
Figure 2:
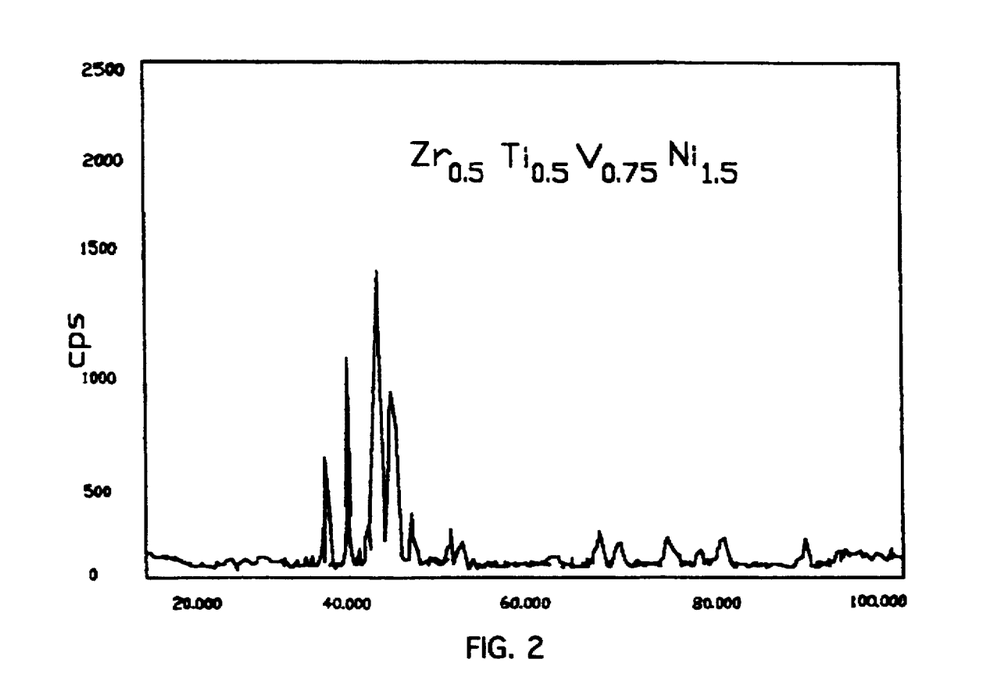
Figure 3:
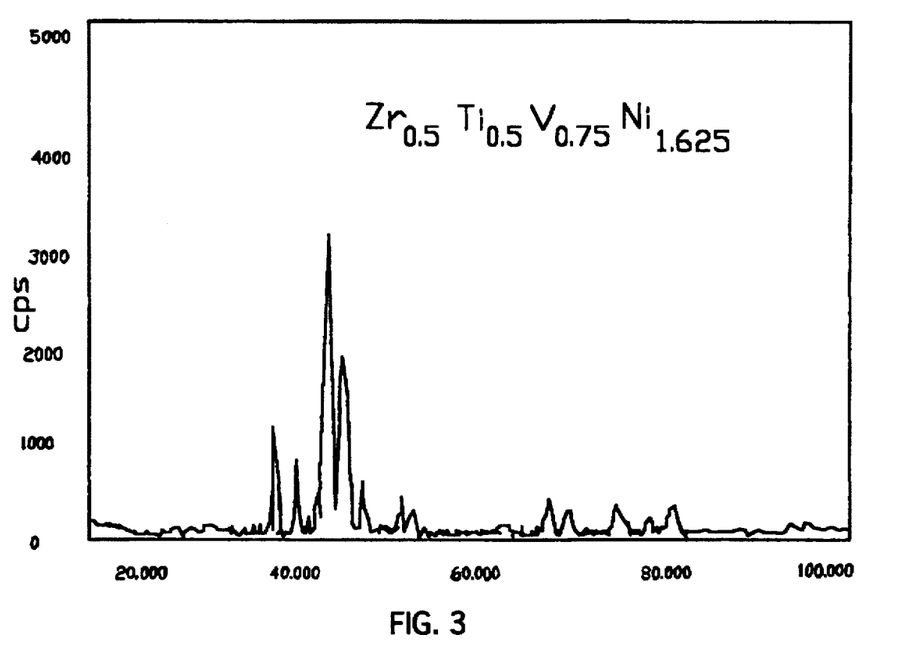
Figure 4:
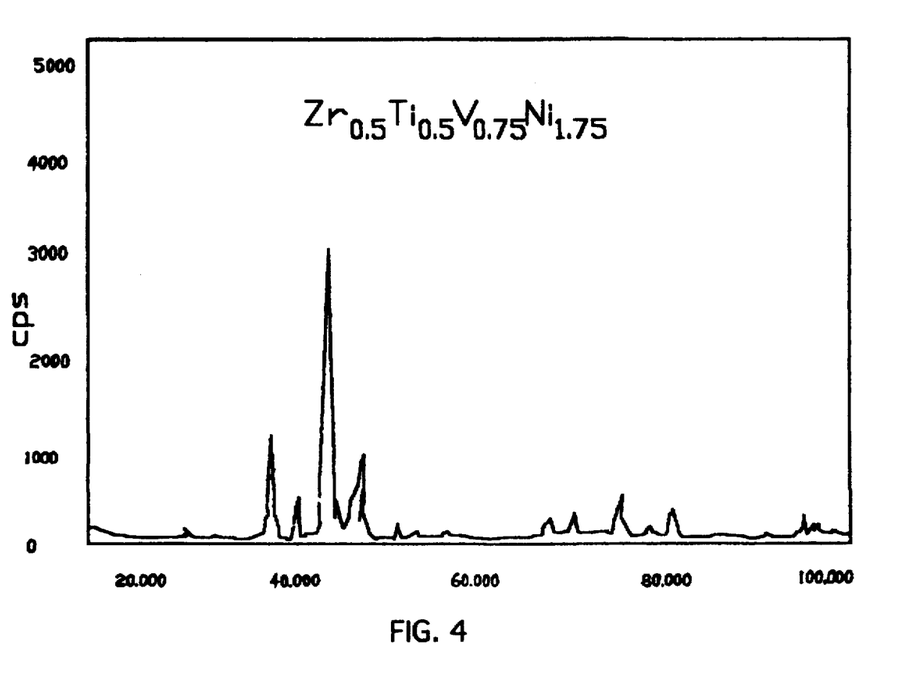
Figure 5:
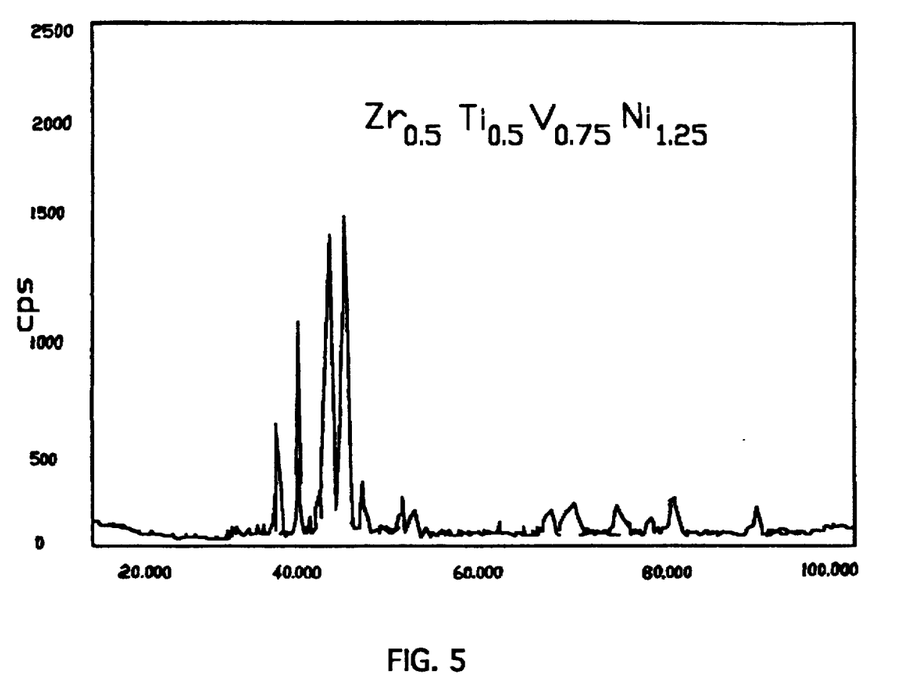
Figure 6:
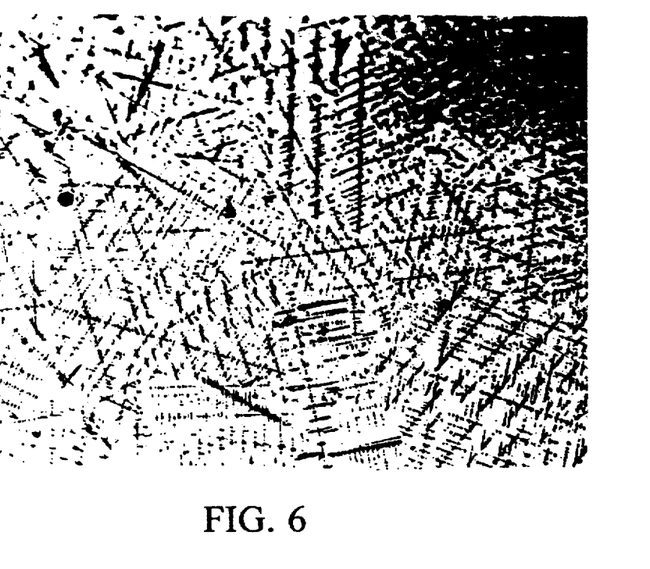
FIGS. 6 and 7 are light photomicrographs of $Zr_{0.5}Ti_{0.5}V_{0.75}Ni_{1.25}$ (dendritic FIG. 6) and $Zr_{0.5}Ti_{0.5}V_{0.75}Ni_{1.5}$ (dendrite-free FIG. 7)
Figure 7:
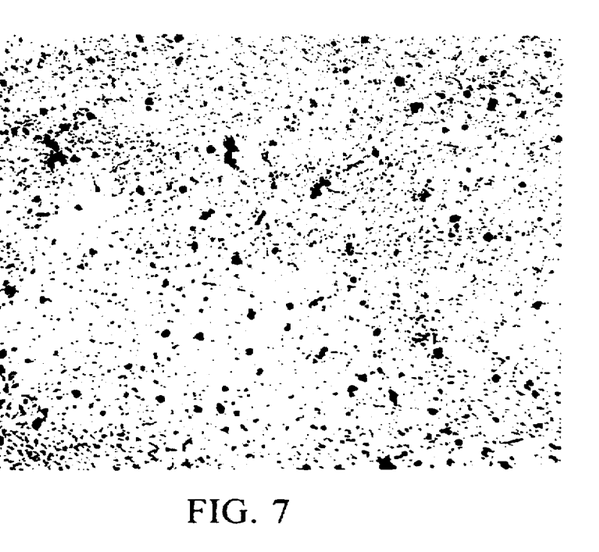

Haruo Sawa et al. published in a paper entitled 'Electrochemocal Properties of Hydrogen-Absorbing Alloy Electrodes of Zr—Ti—V—Ni System Pseudo Binary Laves-Phase' (in Denid Kagaku, a Japanese Journal, the paper is attached herein as an attachment A) the properties of alloys in a form of $Zr_{1-y}Ti_y(V_{1-x}Ni_x)_2$. The alloys disclosed in the article are in a pseudo binary Laves-phase. The electrodes display improved discharge capacity. However, this type of alloys are considered not adequate for battery application due to the shorter life cycles as shown in the test results (please referred to FIG. 11 of the paper). Ovshinsky et al. disclose in another paper entitled "A Nickel Metal Hydride Battery for Electric Vehicles" (Science, Apr. 3, 1993 Volume 260, pp. 176–181) another set of alloys generally in the form of $AB_2$ where a broad varieties of B elements are used. However, as shown in FIG. 1, the alloys disclosed and tested are still in the form of dendrite types and are still limited by lower kinetic capacity of this type of alloys.

Due to these difficulties and limitations, there is still a need in the art of hydrogen storage material to develop new and improved type of material compositions. It is desirable that the new storage material is capable of achieving high electrochemical dynamics while provide long battery cycle life. Additionally, an improved fabrication process must be provided to overcome the difficulties of the conventional methods discussed above.

SUMMARY OF THE PRESENT INVENTION

It is therefore an object of the present invention to provide new type of Zr—Ti—V—Ni alloys with dendrite free structure for hydrogen storage to overcome the aforementioned difficulties encountered in the prior art.

Specifically, it is an object of the present invention to provide new type of Zr—Ti—V—Ni alloys with dendrite free structure for hydrogen storage wherein the electrochemical hydrogen reactions can be carried out in a higher rate thus significantly improving the activation and kinetics of the charge and discharge activities in battery cells while maintaining relative long cell cycle-life.

Another object of the present invention is to provide new type of Zr—Ti—V—Ni alloys with dendrite free structure for hydrogen storage wherein resistance to corrosion of the electrodes for high temperature operation is improved with added weight ratio of nickel to the alloys.

Another object of the present invention is to provide new type of Zr—Ti—V—Ni alloys with dendrite free structure for hydrogen storage wherein La element is added to form inhomogeneous La—Ni clusters which further improve the electrode kinetics.

Briefly, in a preferred embodiment, the present invention comprises a hydrogen storage Laves-phase alloy which has a material composition represented by $A_{1-X}B_XC_Y$ where $A=(Zr$ or $Hf)_{1-x}Ti_{x1}$ and X1 has a value between zero to one, B=La, Ce, Pr, Nd and mixed rare earth, alkaline, or alkaline earth metallic element, $C=V_{Y1}Ni_{Y2}$, where Y1 has a value between zero to 0.8, Y2 has a value between 1.3 to 3.0, and X has a value between zero to 0.2 and Y has a value between 2.0 to 3.0. In a preferred embodiment, when the value of X is greater than zero, the Laves-phase alloy includes a plurality of B—Ni clusters.

It is an advantage of the present invention that it provides new type of Zr—Ti—V—Ni alloys with dendrite free structure for hydrogen storage wherein the electrochemical hydrogen reactions can be carried out in a higher rate thus significantly improving the activation and kinetics of the charge and discharge activities in battery cells while maintaining relative long cell cycle-life.

Another advantage of the present invention is that it provides new type of Zr—Ti—V—Ni alloys with dendrite free structure for hydrogen storage wherein resistance to corrosion of the electrodes for high temperature operation is improved with added weight ratio of nickel to the alloys.

Another advantage of the present invention is that it provides new type of Zr—Ti—V—Ni alloys with dendrite free structure for hydrogen storage wherein La element is added to form inhomogeneous La—Ni clusters which further improve the electrode kinetics.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

An improved type of Zr—Ti—V—Ni alloys with dendrite free structure for alkaline electrolyte to develop a new cathodic hydrogen alloy with improved electrocatalytic activity is disclosed in the present invention. A novel alloy structure which includes inhomogeneous clusters composed of La-rich sites is also disclosed in this invention. This clusters formed by non-soluble crushed powder on the surface of the alloy as discrete sites provides additional catalytic effect by serving as H-transparent windows thus increasing the rate of electrochemical hydrogen reactions.

The material compositions for hydrogen storage disclosed in the present invention includes a novel composition represented by a formula of $A_{1-x}B_xC_y$, wherein $A=(Zr \text{ or } Hf)_{1-xi}Ti_{xi}$, and Xi has a value between zero and one, B=La, Ce, Pr and Na and mixture of rare earth elements, $C=V_{Y1}Ni_{Y2}$ and Y1 has a value between zero to 0.8 and Y2 has a value between 1.3 to 3.0. The material composition is then processed to obtain a dendrite-free structure. In a preferred embodiment when X is not zero, the alloy includes a plurality of small B—Ni clusters wherein these B—Ni clusters provide a catalytic effect in carrying out the electrochemical reactions in higher speed to enhance hydrogen storage kinetics.

In a $Zr_{0.5}Ti_{0.5}V_{0.75}Ni_{1.25}$ alloy exists in two types of structures, i.e., a dendritic structure (about 80%) and a dendrite-free structure (20%). The dendritic structure is V-rich in content and provides higher hydrogen capacity. However, stronger V—H bonding, and for the same reason, strong Zr—H or Ti—H bonding, are a cause of poor kinetic characteristics. The dendrite-free structure consists of one or two $AB_2$ phases containing all elements with substantial amount of V, trace of free Ti or TiNi; and $ZrO_2$. The present invention provides an alloy by adding more nickel to the alloy to form the dendrite-free structure which decreases the bonding strength of V—H, or Zr—H and Ti—H. The added nickel further improves the catalysis to electrochemical reaction and protects the alloy from alkaline corrosion. In a preferred embodiment, when an alloy of $Zr_{0.5}Ti_{0.5}V_{0.75}Ni_x$ is fabricated with $X \geq 1.375$, a complete dendrite free structure is obtained. Such an alloy is formed by using materials of sponge Ti and Zr, crystal V, pellet and carbonyl Ni, each with a 99.9% purity. These materials are mixed and melted four times while continuously turned to assure homogenous mixture under argon atmosphere on a water-cooled copper plate. The melting process is also performed at a temperature of approximately 950°–1100° C. with arc melting for one to three hours. The alloy represented by a composition of $Zr_{0.5}Ti_{0.5}V_{0.75}Ni_x$ where X has a value between 1.375 to 1.75 are formed which is then crushed mechanically to obtain powder with particles of diameter smaller than 26 microns (μm). An amount of 0.25 grams of alloy is mixed with 0.75 grams of Ni powder and 0.05 PTFE powder which is then sandwiched on nickel mesh and cool pressed at $4 \times 10^8$ Pa to form a electrode pellet of approximately 13 millimeters (mm) in diameter for mounting a nickel line used as electric collector.

Figure 8:
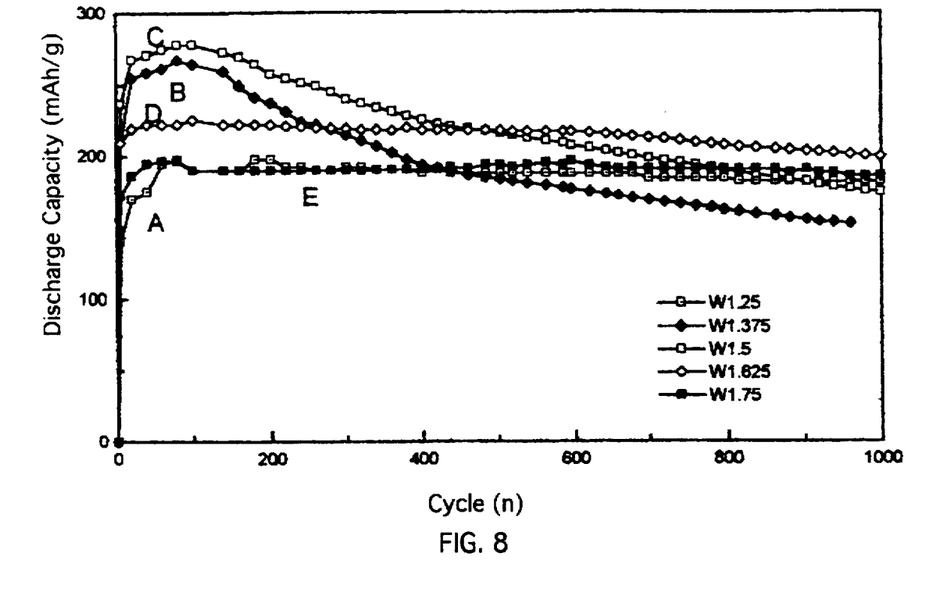
FIGS. 8, 9, and 10 show the discharge capacity as a function of charge and discharge cycles for different alloys of the present invention.
Figure 9:
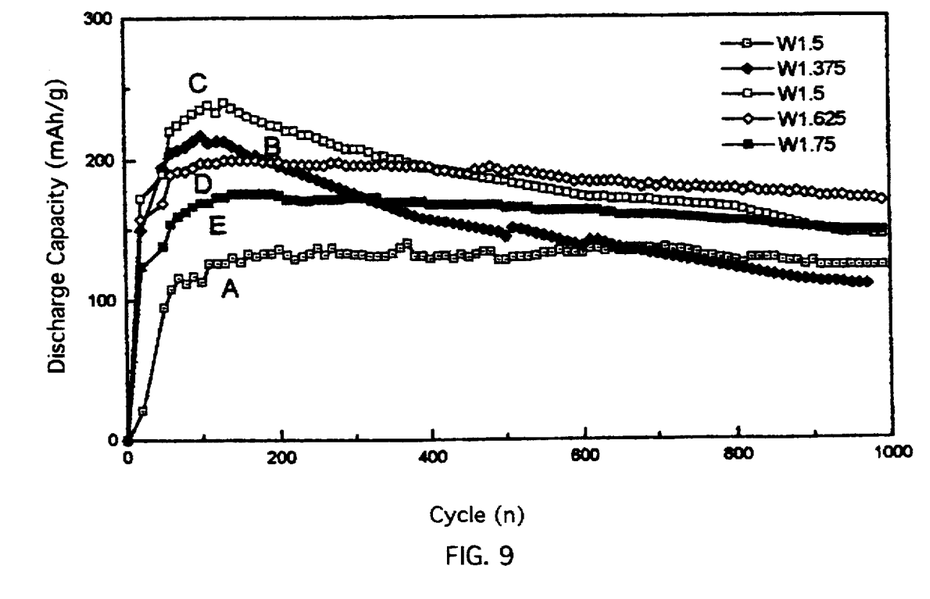
Figure 10:
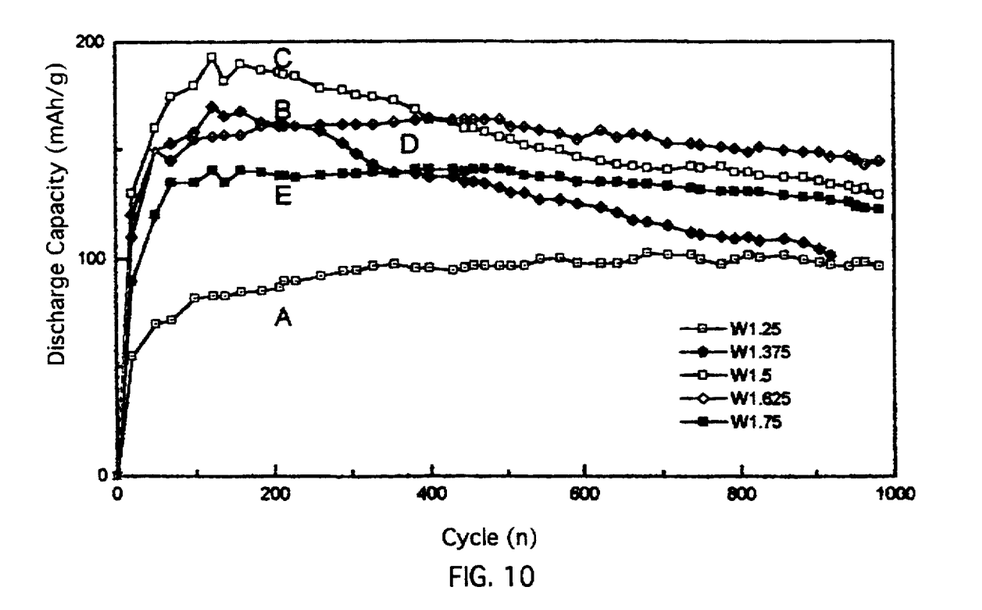
Figure 11:
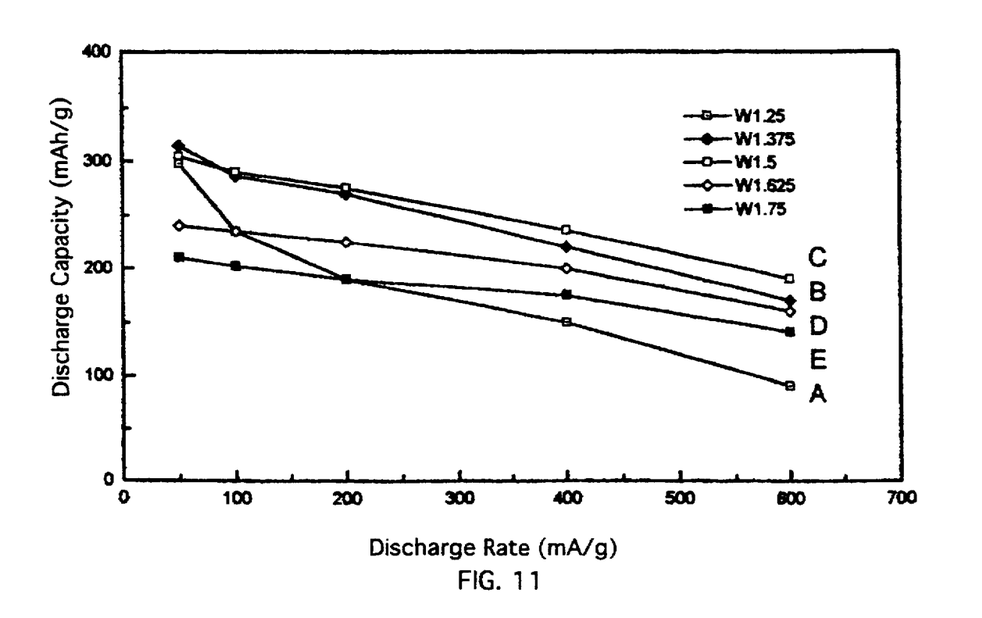
FIG. 11 shows the discharge capacity versus discharge rate for different alloys of the present invention.

The electrodes of the present invention provide improved electrochemical kinetics and activation characteristics. The limitations of low discharge rate at low temperature and short life cycles for operation at higher temperatures are resolved. These improvements are demonstrate by placing the electrode in a central compartment of a Pyrex cell using 6N KOH electrolyte and $Ni(OH)_2/NiOOH$ as counter electrode. The electrodes are charged at 200 mA/g for two hours, rest for ten minutes and discharged to 0.55 volts versus Hg/HgO. The discharge condition for cycle 1–35 is listed in Table 1. After the 35th cycle, the discharge rate is repeated in the same manner as cycles 6–25 except in cycles 101 to 105, 527 to 531 and 607 to 611, the discharge is conducted as that for cycles 31–35. The electrode is activated within the first charge/discharge cycles at 200 mA/g. The kinetics parameters and the charge retention measurements are then performed at 50 mA/g after thirst 12 charge/discharge cycles at 80 mA/g. FIGS. 8, 9, and 10 shows the discharge rates at 200 mA/g, 400 mA/g, and 600 mA/g for electrodes composed of alloy $Zr_{0.5}Ti_{0.5}V_{0.75}Ni_x$ where X has a value of 1.25, 1.375, 1.5, 1.625, and 1.75. Curve A shows the results for X=1.25 which has a structure of dendrite and dendrite-free mixture, while curves B, C, D, and E are measurement results for dendrite-free alloys. It is quite obvious that when $X \geq 1.375$, the discharge rate performance are superior than the non-dendrite free alloys. FIG. 11 a kinetic measurement performed at 200 mA/g of the alloys $Zr_{0.5}Ti_{0.5}V_{0.75}Ni_x$ where X has a value of 1.25, 1.375, 1.5, 1.625, and 1.75. Again, the performance of the dendrite-free alloy (Curves B to E) is better than the non-dendrite-free alloy (Curve A).

TABLE 1

| Discharge Condition for Cycles 1 to 35 | | | | | | | |
|---|---|---|---|---|---|---|---|
| Cycle | 1–10 | 11–15 | 16–20 | 20–25 | 25–30 | 31–32 | 33–35 |
| Rate (mA/g) | 200 | 400 | 600 | 400 | 200 | 50 | 100 |

A second embodiment of the present invention is a dendrite free alloy in the form of $Zr_{0.475}La_{0.05}Ti_{0.5}V_{0.75}Ni_{1.5}$ which is fabricated by essentially the same processing steps as described above for an alloy represented by $Zr_{0.5}Ti_{0.5}V_{0.75}Ni_x$. Alloy samples of about 25 grams are fabricated by arc melting under argon atmosphere on a water cooled copper plate of materials including sponge Ti and Zr, crystal V, pellet and carbonyl Ni and ingot La. The 25 gram specimen is melted four times, turning the specimen each time to assure homogeneity. Alloy compositions of $Zr_{0.5}Ti_{0.5}V_{0.75}Ni_x$ where the composition is denoted as $W_x$, i.e., $W_{1.5}$ when X=1.5, and $Zr_{0.475}La_{0.05}Ti_{0.5}V_{0.75}Ni_{1.5}$, denoted as $0.05 \text{ La} + W_{1.5}$ are made. Since La is not soluble in the $AB_2$ phase alloy, 0.05 La is separately denoted for defining the material composition. The alloys are crushed mechanically to obtain powder of diameter smaller than 26 microns. The alloy is mixed with nickel powder and adhesive agent PTFE and sandwiched in a nickel mesh and cold pressed to form a pellet for welding to a nickel line. The electrode formed is then placed into a central compartment of a Pyrex cell using 6N KOH electrolyte and $Ni(OH)_2/NiOOH$ as counter electrode for measurement of charging and discharging operations.

The present invention thus teaches a method for fabricating a Laves-phase hydrogen storage material comprising the steps of: (a) mixing metal elements according to weight proportions for making an alloy represented by a composition formula as $A_{1-x}B_xC_y$, wherein: A representing $R_{1-x1}Ti_{x1}$ wherein R is an element selected from the group consists of Zr or Hf, and X1 is a real number having a value between zero and one; B=La, Ce, Pr, Nd and mixed with rare earth, alkaline, or alkaline earth metallic element; and $C=V_{Y1}Ni_{Y2}$, where Y1 has a value between zero to 0.8, Y2 has a value between 1.3 to 3.0, and X has a value between zero to 0.2 and Y has a value between 2.0 to 3.0; (b) melting the metal elements under argon atmosphere for three to five times to form an dendrite-free alloy; (c) crushing the dendrite-free alloy into powder of particles of diameter about than 25 microns (μm); (d) mixing the powder with Ni powder and PTFE powder into a powder mixture; and (e) sandwiching the powder mixture in a nickel mesh and forming an electrode pellet by carrying out a cool press process.

Figure 12:
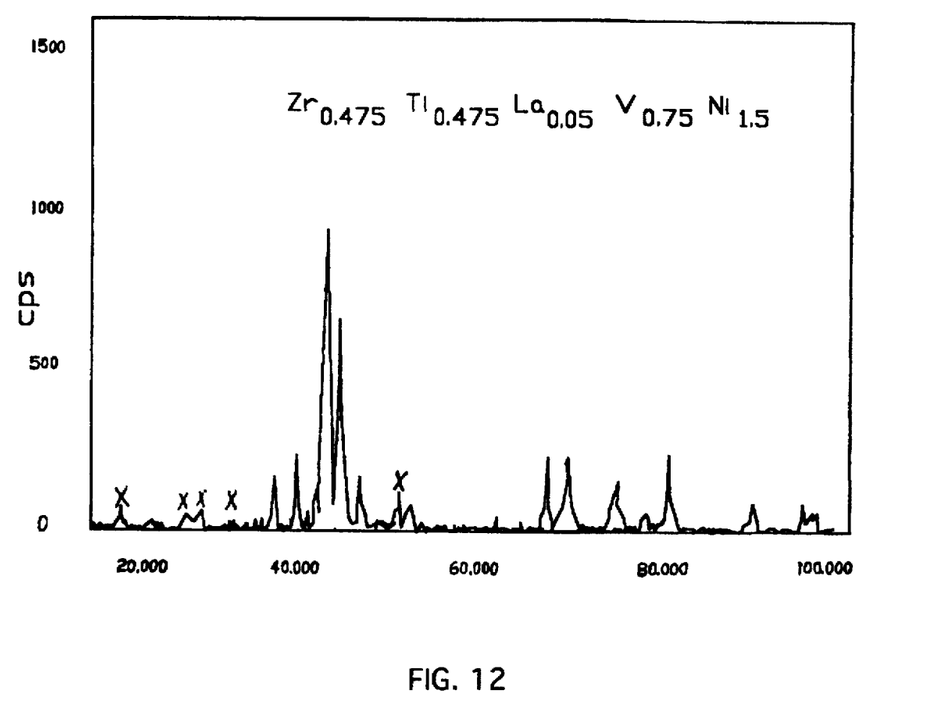
FIG. 12 shows the spectra of X-Ray Diffraction (XRD) analysis for alloy $Zr_{0.75}Ti_{0.475}La_{0.05}V_{0.75}Ni_{1.5}$.
Figure 13:
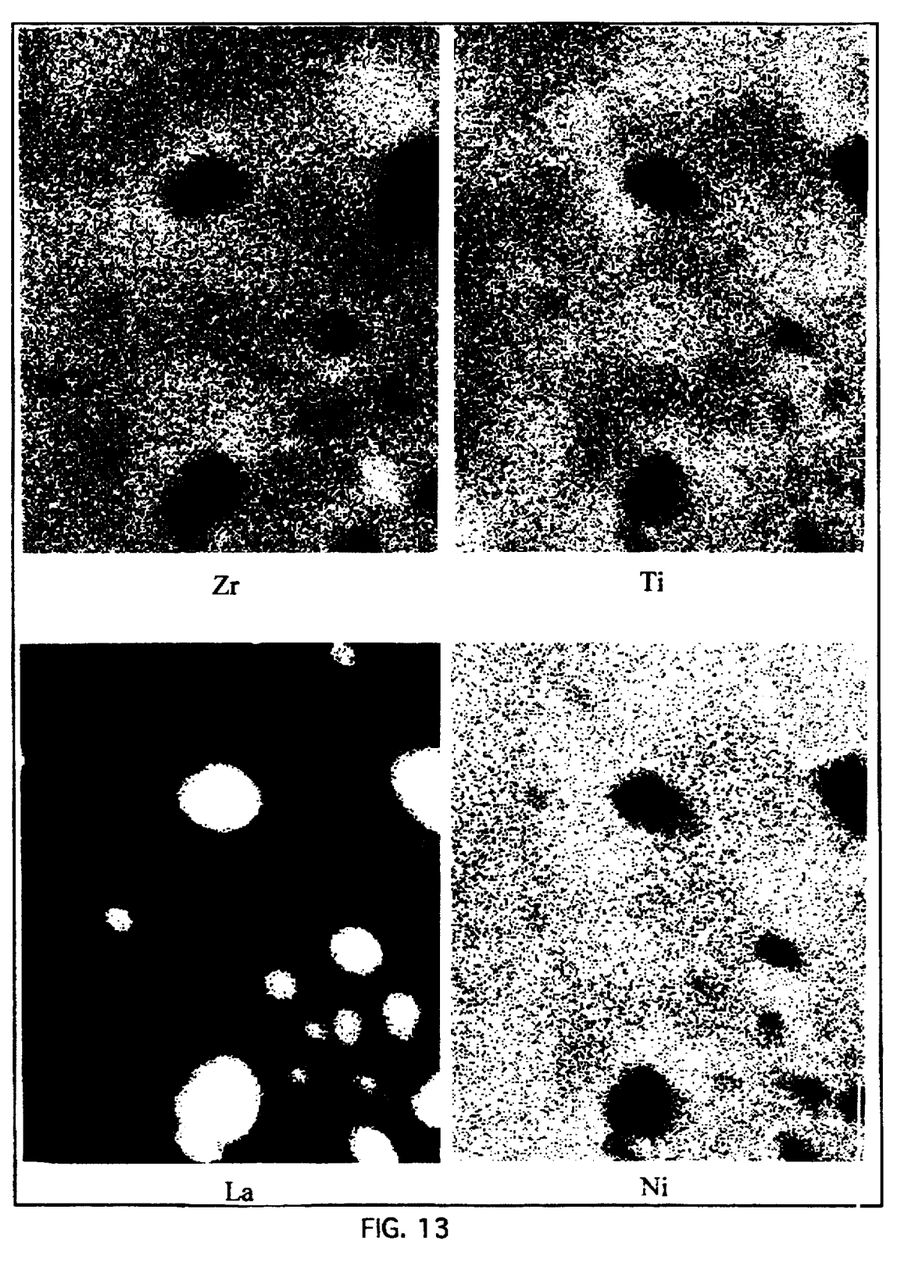
FIGS. 13 and 14 are the EPMA results for an alloy of $Zr_{0.475}Ti_{0.475}La_{0.05}V_{0.75}Ni_{1.5}$.
Figure 14:
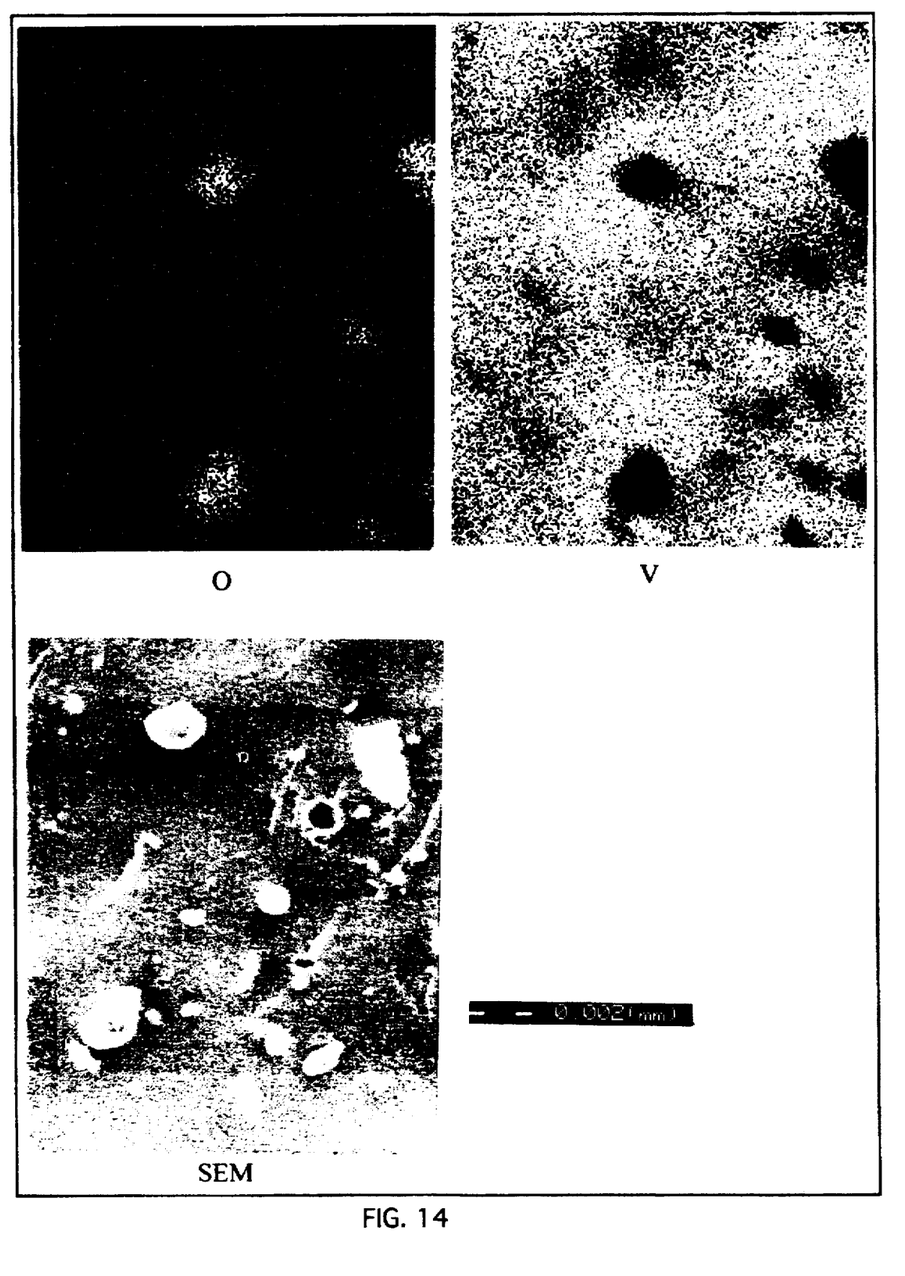

An X-ray spectrum for the alloy $Zr_{0.475}La_{0.05}V_{0.75}Ni_{1.5}$ is shown in FIG. 12 where the peaks as marked by symbol X are peaks generated from the amalgamate phases of La—Ni alloy. FIGS. 13 and 14 show the cross-sectional view of the alloy taken from an electronic microscope. From FIG. 13, it can be determined that the presence of La is not in a form of single phase but rather in a combined La—Ni alloy phase which exists as isolated small nonhomogeneous islands. It is also clear from these pictures that the Ni has a non-homogeneous distribution. The addition of La decorates a C14 bulk phase with a highly electrocatalytic La—Ni phase and improves the kinetic behaviors in hydrogen storage reactions. Since La forms more H-transparent hydroxides, i.e., $La(OH)_3$ than the Ti—Zr-rich oxides for a conventional $AB_2$ alloy, the La—Ni clusters serve as reaction sites during electrochemical reactions thus increasing the reaction rates.

Figure 15:
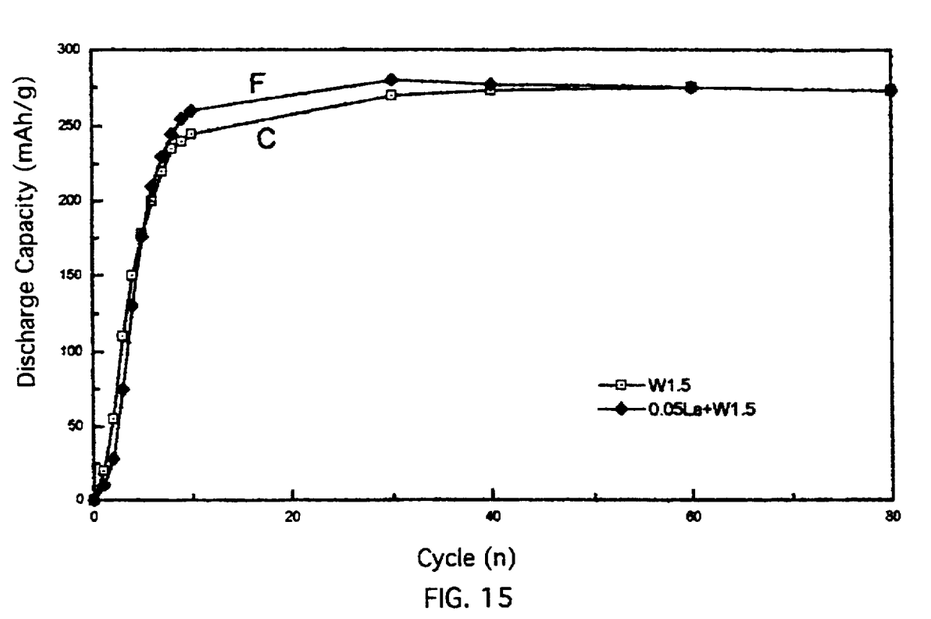
FIGS. 15, 16, and 17 shows the discharge capacity as the function of charge and discharge cycles for alloys of the present invention.
Figure 16:
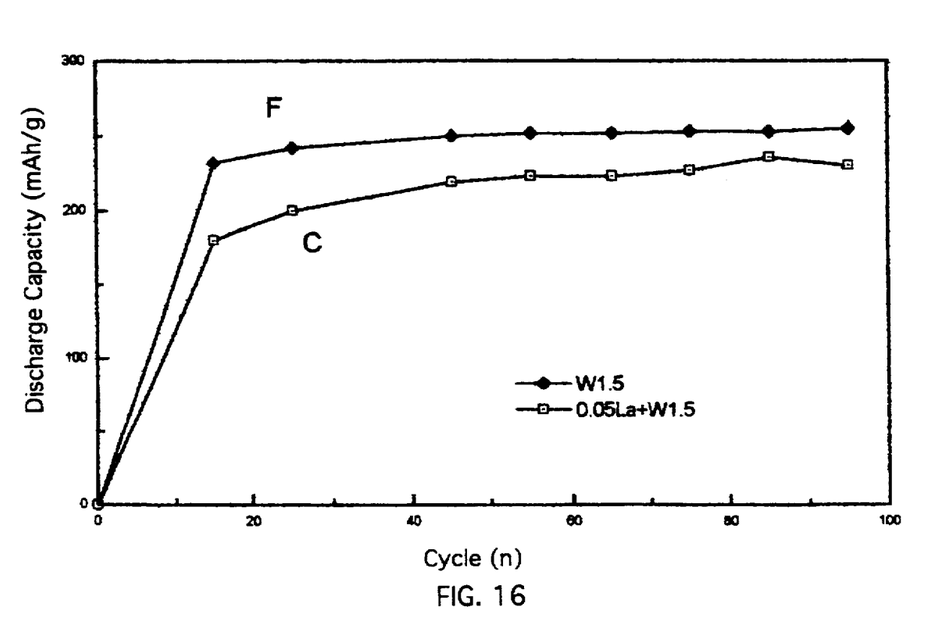
Figure 17:
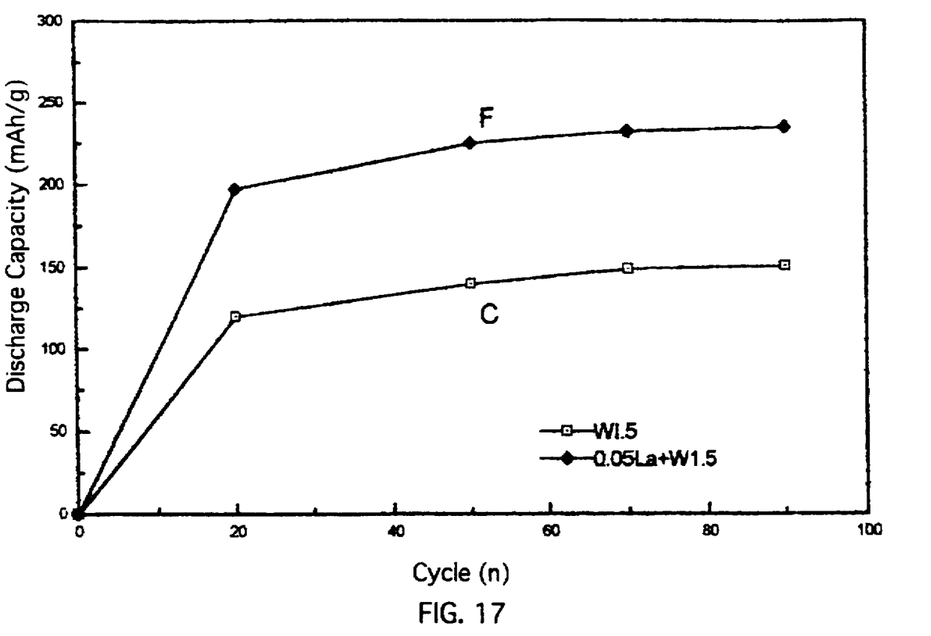
Figure 18:
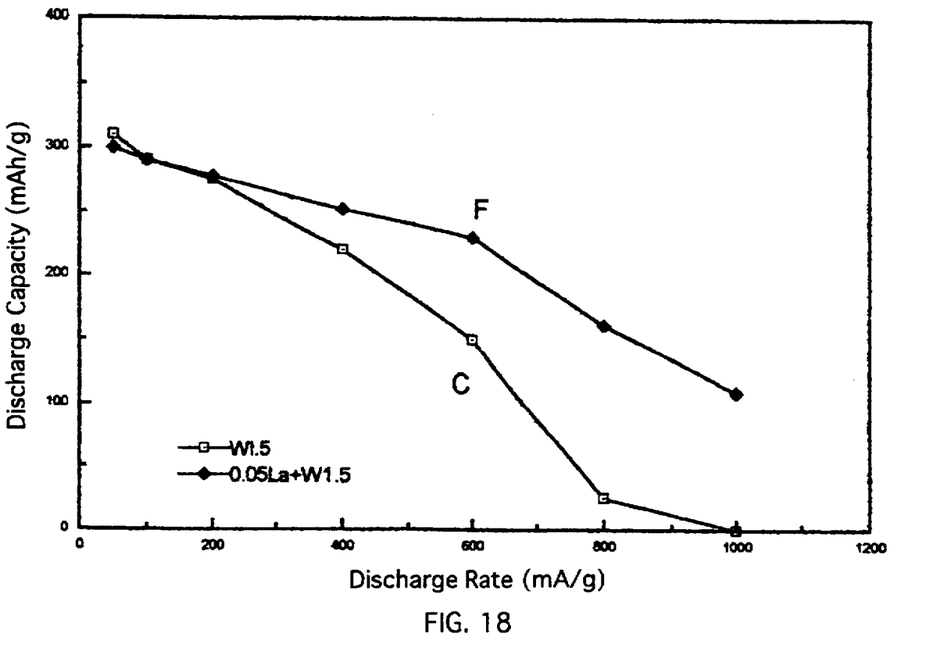
FIG. 18 shows the discharge capacity versus discharge rate for different alloys of the present invention.

FIG. 15 to 17 shows the results of chemical tests performed for the $Zr_{0.475}La_{0.05}V_{0.75}Ni_{1.5}$ alloy. The discharge rates at 200 mA/g, 400 mA/g and 600 mA/g as function of cycle life. Curve F is the discharge capacity of the alloy $Zr_{0.475}La_{0.05}V_{0.75}Ni_{1.5}$ while cure C is for alloy $Zr_{0.5}Ti_{0.5}V_{0.75}Ni_{1.5}$. FIG. 18 compares the discharge capacity under different discharge rates between the alloy $Zr_{0.475}La_{0.05}TiV_{0.75}Ni_{1.5}$ (Curve F) and $Zr_{0.5}Ti_{0.5}V_{0.75}Ni_{1.5}$ (Curve C). Clear improvements in electrochemical kinetics are achieved by the $Zr_{0.475}La_{0.05}V_{0.75}Ni_{1.5}$ alloy. This invention thus teaches a method of improving the kinetics of electrochemical hydrogen reaction using La substituted Zr—Ti—V—Ni alloy in accelerating the activation process and the hydrogen storability.

Thus, the present invention teaches a Laves-phase hydrogen storage material composition. The material composition includes an alloy represented by a composition formula as $A_{1-x}B_xC_y$, wherein: A representing $R_{1-x1}Ti_{x1}$ wherein R is an element selected from the group consists of Zr or Hf, and X1 is a real number having a value between zero and one; B=La, Ce, Pr, Nd and mixed with rare earth, alkaline, or alkaline earth metallic element; and $C=V_{Y1}Ni_{Y2}$, where Y1 has a value between zero to 0.8, Y2 has a value between 1.3 to 3.0, and X has a value between zero to 0.2 and Y has a value between 2.0 to 3.0. In a preferred embodiment of the present invention, the hydrogen storage material composition includes an alloy which has a dendrite-free structure.

The present invention thus provides new type of Zr—Ti—V—Ni alloys with dendrite free structure for hydrogen storage which enables those of ordinary sill in the art to overcome the difficulties and limitations encountered in the prior art. Specifically, the present invention provides new type of Zr—Ti—V—Ni alloys with dendrite free structure for hydrogen storage wherein the electrochemical hydrogen reactions can be carried out in a higher rate thus significantly improving the activation and kinetics of the charge and discharge activities in battery cells while maintaining relative long cell cycle-life. This new hydrogen storage electrodes also have improved resistance to corrosion for high temperature operation when higher weight ratio of nickel is added to the alloys. This new type of Zr—Ti—V—Ni alloys also achieve improvements in electrode kinetics when La element is added to form inhomogeneous La—Ni clusters on the electrodes.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A Laves-phase hydrogen storage material composition comprising:

an alloy represented by a composition formula as $\alpha_{1-x}\beta_x\chi_y$, wherein:

α representing $R_{1-x1}Ti_{x1}$ wherein R is an element selected from the group consists of Zr or Hf, and X1 is a real number having a value between zero and one;

β includes at least one element selected from a group consists of La, Ce, Pr, Nd and mixed with rare earth, alkaline, or alkaline earth metallic element;

$\chi=V_{Y1}Ni_{Y2}$, where Y1 has a value between zero to 0.8, Y2 has a value between 1.3 to 3.0, and X has a value between zero to 0.2 and Y has a value between 2.0 to 3.0; and said alloy having a dendrite free structure which further includes atoms of V, and Ti and compositions of TiNi and $ZrO_2$.

2. The hydrogen storage material composition of claim 1 wherein:

said alloy further includes La formed from a La ingot disposed in said alloy as insoluble La sites therein.

3. The hydrogen storage material composition of claim 1 wherein:

said alloy further including inhomogeneous La—Ni islands in said dendrite-free structure to function as electrochemical catalytic clusters therein.

4. The hydrogen storage material composition of claim 1 wherein:

said alloy is an alloy of $Zr_{0.475}La_{0.05}V_{0.75}Ni_w$ where w is a real number between 1.375 to 2.0.

5. The hydrogen storage material composition of claim 1 wherein:

said alloy further including inhomogeneous β-Ni islands in said dendrite-free structure to function as electrochemical catalytic clusters therein.

* * * * *